US012480972B2

(12) United States Patent
Becherer et al.

(10) Patent No.: US 12,480,972 B2
(45) Date of Patent: Nov. 25, 2025

(54) CONTACTING UNIT FOR AN IMPEDANCE LIMIT SWITCH

(71) Applicant: VEGA Grieshaber KG, Wolfach (DE)

(72) Inventors: Frank Becherer, Neuried (DE); Tobias Bader, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 163 days.

(21) Appl. No.: 18/262,148

(22) PCT Filed: Feb. 21, 2022

(86) PCT No.: PCT/EP2022/054260
§ 371 (c)(1),
(2) Date: Jul. 19, 2023

(87) PCT Pub. No.: WO2022/185525
PCT Pub. Date: Aug. 25, 2022

(65) Prior Publication Data
US 2024/0302407 A1    Sep. 12, 2024

(30) Foreign Application Priority Data
Feb. 22, 2021   (DE) .................. 10 2021 201 661.8

(51) Int. Cl.
*G01R 1/04*       (2006.01)
*G01F 23/263*     (2022.01)

(52) U.S. Cl.
CPC ......... *G01R 1/0416* (2013.01); *G01F 23/265* (2013.01)

(58) Field of Classification Search
CPC ... G01R 1/0416; G01F 23/265; G01F 23/261; G01F 23/243
See application file for complete search history.

(56) References Cited

U.S. PATENT DOCUMENTS 5,807,117 A * 9/1998 Kempf .................. H01R 13/18
439/63
7,826,725 B2 * 11/2010 Wolff ................... G01F 23/242
392/338
(Continued)

FOREIGN PATENT DOCUMENTS

DE    10 2011 004 807      8/2012
DE    10 2016 211 256 A1   12/2017
(Continued)

OTHER PUBLICATIONS

Office Action issued Jan. 5, 2022, in corresponding German Patent Application No. 10 2021 201 661.8, 7 pages.
(Continued)

*Primary Examiner* — Jermele M Hollington
*Assistant Examiner* — Zannatul Ferdous
(74) *Attorney, Agent, or Firm* — Oblon, McClelland, Maier & Neustadt, L.L.P.

(57) ABSTRACT

A contacting device is provided for an impedance limit switch, the contacting device including: a printed circuit board having an electrically conductive contact surface; a radially disposed annular spring configured to establish electrical contact between the electrically conductive contact surface of the printed circuit board and at least one electrode of the impedance limit switch; and a non-conductive housing element. An impedance limit switch is also provided, including the contacting device; an electronic cup; and a measuring head configured to carry out a conductive and/or capacitive measurement and to record measurement data, the contacting device being configured to transmit the measurement data from the measuring head to the electronic cup via the contacting unit.

15 Claims, 6 Drawing Sheets

(56) References Cited

U.S. PATENT DOCUMENTS

| | | | |
|---|---|---|---|
| 2004/0004487 A1 | 1/2004 | Vanzuilen et al. | |
| 2005/0253599 A1 | 11/2005 | Vanzullen et al. | |
| 2008/0255631 A1 | 10/2008 | Sjostedt et al. | |
| 2013/0333466 A1 | 12/2013 | Schmidt et al. | |
| 2014/0378008 A1* | 12/2014 | Young | H01R 12/716 |
| | | | 439/816 |
| 2017/0191861 A1 | 7/2017 | Rondano et al. | |
| 2017/0343407 A1 | 11/2017 | Schmidt et al. | |
| 2018/0132643 A1* | 5/2018 | Shklar | G01F 23/266 |
| 2019/0128726 A1* | 5/2019 | Zorzetto | G01F 23/268 |
| 2020/0264029 A1* | 8/2020 | Wernet | G01F 23/268 |

FOREIGN PATENT DOCUMENTS

| | | |
|---|---|---|
| EP | 3 599 670 A1 | 1/2020 |
| WO | WO 98/02937 | 1/1998 |
| WO | WO 2016/091497 A1 | 6/2016 |
| WO | WO 2017/220258 A1 | 12/2017 |

OTHER PUBLICATIONS

International Search Report Issued Jun. 20, 2022, in PCT/EP2022/054260, filed on Feb. 21, 2022, 2 pages.

English translation of International Preliminary Report on Patentability and Written Opinion issued Aug. 31, 2023 in PCT/EP2022/054260, 10 pages.

* cited by examiner

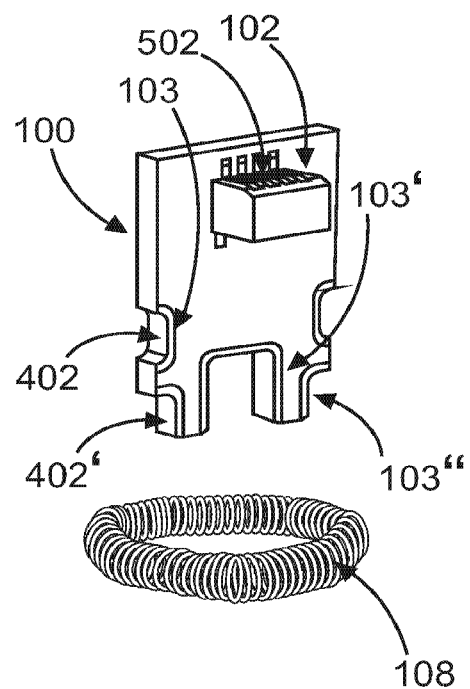
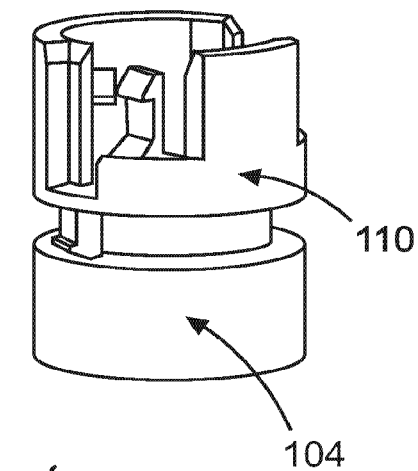
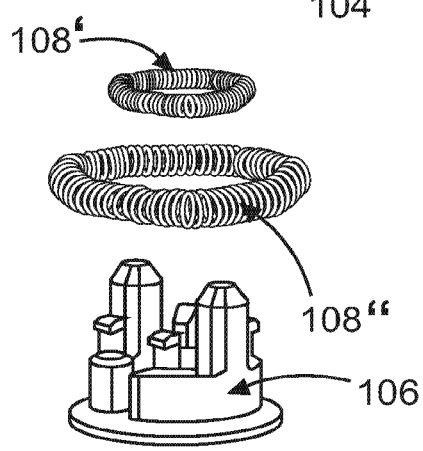
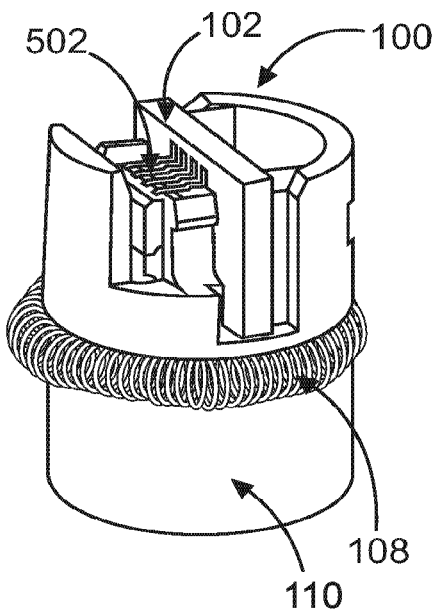
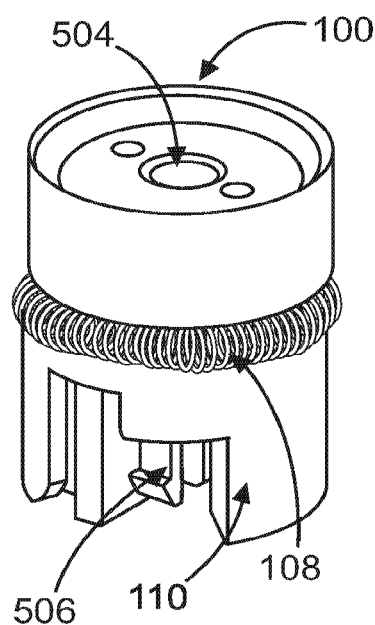
Fig. 5a
Fig. 5b
Fig. 5c

CONTACTING UNIT FOR AN IMPEDANCE LIMIT SWITCH

REFERENCE TO RELATED APPLICATIONS

The present application claims priority to German Patent Application No. 10 2021 201 661.8, filed Feb. 22, 2021, which is incorporated herein by reference in its entirety.

FIELD OF INVENTION

The invention relates generally to the field of electrical contacting in a measuring device. In particular, the invention relates to a contacting unit for an impedance limit switch, an impedance limit switch comprising such a contacting unit, and the use of such a contacting unit.

BACKGROUND

Inside or outside a field device or a sensor, numerous electrical contacts are necessary, which serve different purposes. Here, electrical contacting can be made by means of plugs and sockets. Furthermore, flex conductors, for example, can be used in the field of laser technology and/or measurement technology, mostly in connection with ribbon cables.

SUMMARY OF THE INVENTION

It is an object of the present invention to provide a contacting unit for an impedance limit switch which enables high electrical contact reliability.

This object is solved by the features of the independent patent claims. Further embodiments of the invention result from the subclaims and the following description of embodiments.

A first aspect of the present disclosure relates to a contacting unit for an impedance limit switch, which is arranged to establish an electrical contact between at least one contact surface of a printed circuit board and at least one electrode of the impedance limit switch. The contacting unit comprises a printed circuit board having an electrically conductive contact surface, a radially arranged annular spring for establishing an electrical contact between the contact surface of the printed circuit board and the electrode of the impedance limit switch, and a non-conductive housing element.

The printed circuit board may be an electronics contacting board, an electronics assembly, or any carrier of electronic components. It should be noted that the contacting unit may comprise a plurality of printed circuit boards. For example, the printed circuit board may further comprise a female unit and/or a male unit such that the printed circuit board may be connectable thereover to an electronics unit. The printed circuit board may include electronic components. Apart from the contact surface, the printed circuit board may be made of plastic. The contact surface may generally be any surface that may be conductive in contact or in contact with the annular spring. Thus, by making an electrical contact, a circuit may be established.

The annular spring can be a donut-type and/or a full torus-type spring. However, other geometries are also possible. The annular spring can be arranged radially or axially. It should be noted that several annular springs are also conceivable.

The impedance limit switch may be arranged or configured to measure a limit level and/or a fill level of a container and/or a body of water and/or a storage location. The impedance limit switch may measure any medium in any container. The impedance limit switch may have electronics necessary to make such measurements. The impedance limit switch may further be designed to be attached to a container.

Sensors, such as impedance limit switches, can be exposed to vibrations, so it can prove advantageous to use a vibration-resistant electrical contact in such a sensor. For example, a vibration-resistant electrical contact can be used to prevent breaks in the circuit. In the present case, the circuit can be closed and/or guaranteed with the annular spring. By contacting multiple turns or windings and/or using a ring spring to make the electrical contact, greater contact reliability can be achieved between the contact surface of the circuit board and the electrode. The annular spring can provide radial and axial tolerance compensation. Thus, for example, such a contacting unit can reduce the sensitivity to vibrations of an impedance limit switch.

According to an embodiment, the contact surface of the printed circuit board is arranged on one of two notches of the printed circuit board. Alternatively, the contact surface of the printed circuit board may be arranged at several notches of the printed circuit board. In other words, the contact surface of the printed circuit board can be arranged in such a way that the contact between the contact surface and the annular spring can be optimized.

According to an embodiment, the notches are arranged opposite each other in the radial direction of the printed circuit board and have a notch radius which corresponds to the cylinder radius of the annular spring. In other words, the notches can be designed in such a way that the contact on the outer contour of the annular spring is as snug as possible, the term "as snug as possible" being understood broadly in the context of the present application. In this way, the contact between the contact surface of the corresponding notch and the annular spring can be increased. The notches may also have other notch radii or geometries.

According to an embodiment, the housing element is designed to clamp the annular spring to the printed circuit board via its notch. It is conceivable, for example, that the housing element has a cavity or recess provided for this purpose. In this context, such a void or recess can, for example, be arranged in such a way that it can be opposite the contact surface of the printed circuit board. Thus, for example, the annular spring can be accommodated in the empty space of the housing element or in a depression of the housing element, so that the annular spring can be held in optimum contact with the contact surface of the printed circuit board.

According to an embodiment, the contacting unit is designed to be plugged onto an electronics cup of the impedance limit switch. For this purpose, for example, the housing element may comprise mechanical connection devices and/or comprise a plug-on mechanism. The term "plug-on" is to be understood broadly in the context of the present application. It may mean, for example, connecting, coupling or clamping.

According to an embodiment, the electrode is a measuring electrode, a shield electrode, and/or a process connection. In other words, the contacted area can be part of a measuring electrode, a shield electrode and/or a process connection. This may also be a shielding element, which may protrude above the annular spring, for example.

According to an embodiment, the shield electrode surrounds, covers, and/or encases one or more annular springs.

According to an embodiment, the housing element is made in two parts and has a holder and an insert. The holder and the insert are geometrically matched to each other so that the insert can be snapped into the holder to receive and fix the annular spring. In other words, the housing element may have an assembly-like structure. A two-part housing element may be advantageous, for example, when assembling or disassembling the contacting unit. For example, one or more annular springs can be attached to the holder and only fixed afterwards by attaching or engaging the insert in the holder.

According to an embodiment, the housing element is rotationally symmetrical. A rotationally symmetrical housing can prove advantageous, for example, if the contacting unit is attached to the impedance limit switch via a thread. It is also possible that the printed circuit board is also rotationally symmetrical.

According to an embodiment, the contact surface of the printed circuit board is coated with an electrically conductive material. Alternatively or additionally, the ring spring is coated with an electrically conductive material. The electrically conductive material can be ceramic, silver, copper, gold and/or graphene. It can also be an alloy.

According to an embodiment, the housing element is made of plastic by means of an injection molding process.

According to an embodiment, the contacting unit has two or three concentrically arranged annular springs. Each of the two or three annular springs can be in electrical contact with different electrodes, measuring probes and/or process connections.

According to an embodiment, the printed circuit board has two notches for each annular spring. The corresponding two notches are designed to provide the electrical contact between the corresponding annular spring and the printed circuit board. Thus, for example, each annular spring can form a different electrical circuit. It is conceivable, for example, that the one annular spring is, on the one hand, in contact with a contact surface of the printed circuit board and, at the same time, in contact with a measuring probe. The second ring spring can, for example, be in contact with a contact surface of the printed circuit board and simultaneously in contact with a process connection.

According to an embodiment, the two or three concentrically arranged ring springs have different cylinder radii and/or different ring diameters. It should be noted that any number of annular springs is also conceivable. Thus, the different annular springs may be arranged at different locations of the printed circuit board and/or the contacting unit. By the term "locations", an axial and/or radial position can be meant.

Another aspect of the present disclosure relates to an impedance limit switch. The impedance switch comprises a contacting unit, as described above and below, an electronic cup and a measuring head, which is adapted to perform a conductive and/or capacitive measurement and to acquire measurement data. The contacting unit is set up to forward the measurement data from the measuring head via the contacting unit to the electronics cup.

Another aspect of the present disclosure relates to the use of a contacting unit, as described above and below, to transmit measurement data from a measurement head via the contacting unit to an electronic cup of a measuring device.

In the following, embodiments of the present disclosure are described with reference to the figures. If the same reference signs are used in the following description of figures, these designate the same or similar elements. The representations in the figures are schematic and not to scale.

BRIEF DESCRIPTION OF THE FIGURES

FIGS. 5a to 5e show a contacting unit according to a further embodiment.

DETAILED DESCRIPTION OF EMBODIMENTS

Figure 1:
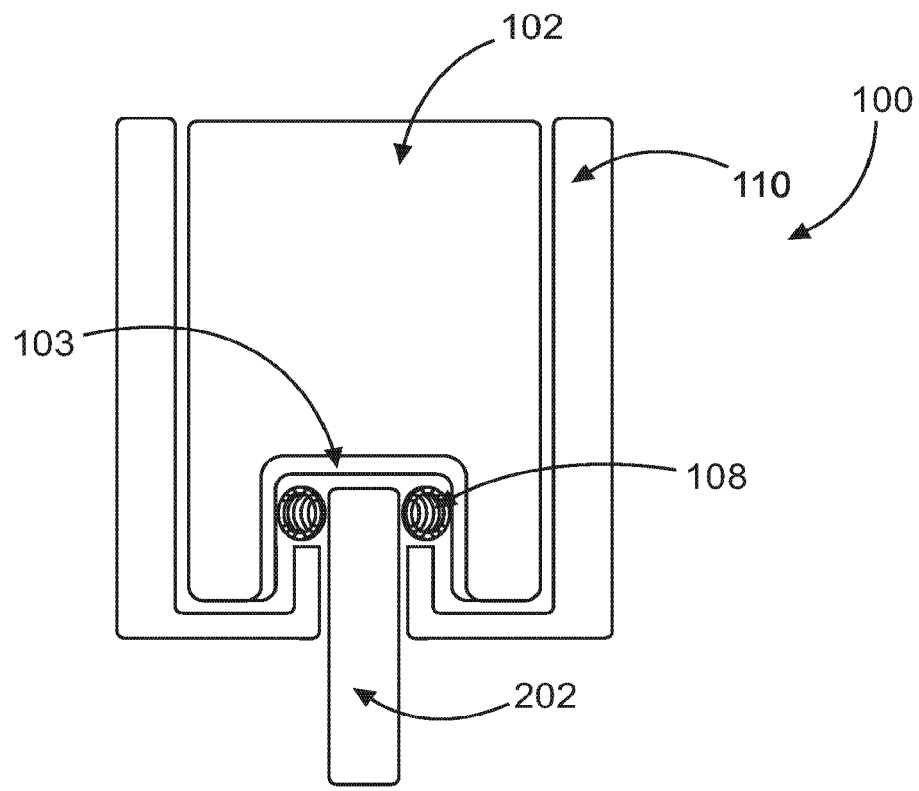
FIG. 1 shows a contacting unit according to an embodiment.

FIG. 1 shows a contacting unit 100 according to an embodiment. In particular, FIG. 1 shows a sectional view of a contacting unit. The contacting unit of FIG. 1 comprises a printed circuit board 102 with an electrically conductive contact surface 103, an electrically non-conductive housing element 110 and a ring spring 108. The annular spring 108 is arranged and designed in such a way that it serves to make electrical contact between the printed circuit board and an electrode 202 of an impedance limit switch (not shown in FIG. 1). For this purpose, the annular spring 108 may be coated with an electrically conductive material or may even be made of an electrically conductive material. For example, the annular spring 108 is gold-plated. The contact surface 103 of the printed circuit board 102 may likewise be coated with an electrically conductive material. Thus, electrical contacting takes place between the annular spring 108 and the contact surface 103 and between the annular spring 108 and the electrode 202. The annular spring 108 may be arranged in the contacting unit such that it surrounds the electrode 202. The housing element 110 may be made of plastic, for example, using an injection molding process. The housing element 110 is further configured to hold or clamp the annular spring 108 against the contact surface 103 of the circuit board 102. The contacting unit of FIG. 1 allows a compact installation space, with simultaneous radial and axial tolerance compensation and electrical shielding.

Figure 2:
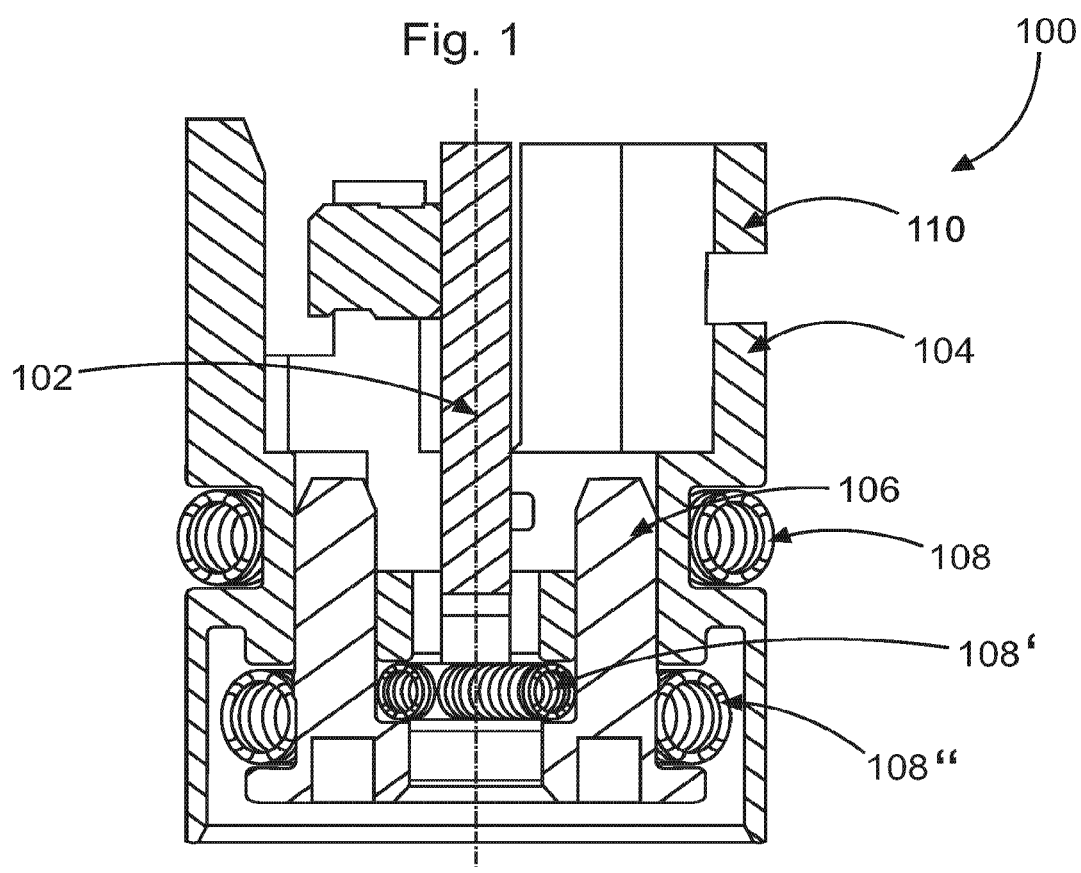
FIG. 2 shows a contacting unit according to a further embodiment.

FIG. 2 shows a contacting unit 100 according to a further embodiment. Unless otherwise described, the contacting unit 100 of FIG. 2 has the same elements and/or components as the contacting unit 100 of FIG. 1. The contacting unit 100 of FIG. 2 has three annular springs 108, 108', 108", each having a different cylinder radius and annular radius. In the embodiment of FIG. 2, the housing element 110 is made in two parts and comprises a holder 104 and an insert 106. A two-part housing element 110 can, for example, simplify the attachment of the annular springs 108, 108', 108" during assembly of the contacting unit 100. Each annular spring 108, 108, 108' is in electrically conductive contact or in contact with a contact surface of the printed circuit board 102 (not visible here). As soon as the respective annular spring 108, 108', 108" is likewise in contact with an electrode 202 or with a process connection, an electric circuit can thus be formed. Three circuits can thus be formed with three annular springs.

Figure 3A:
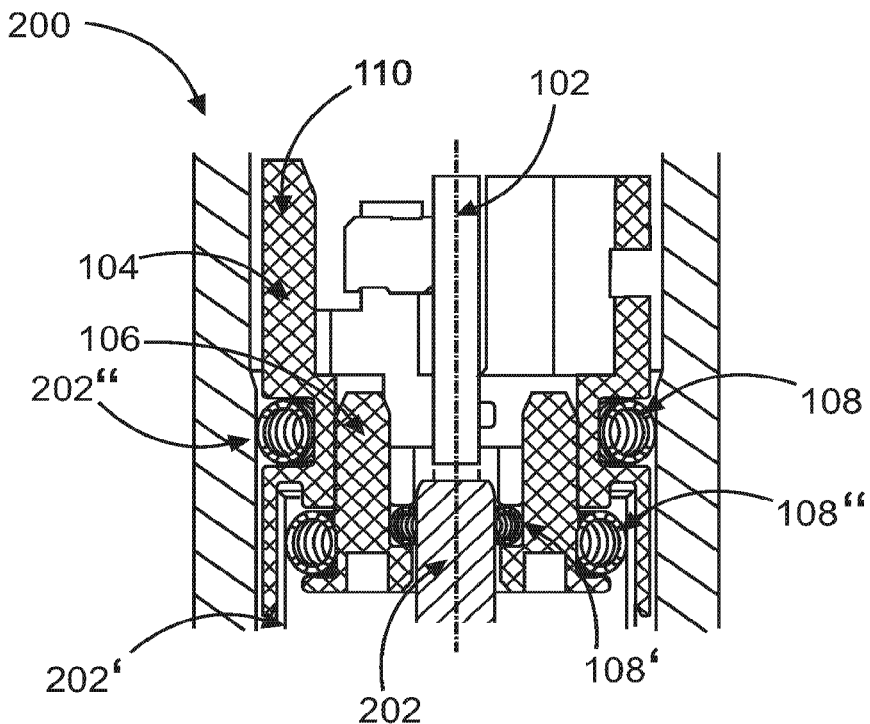
FIGS. 3a and 3b show an impedance limit switch according to one embodiment.
Figure 3B:
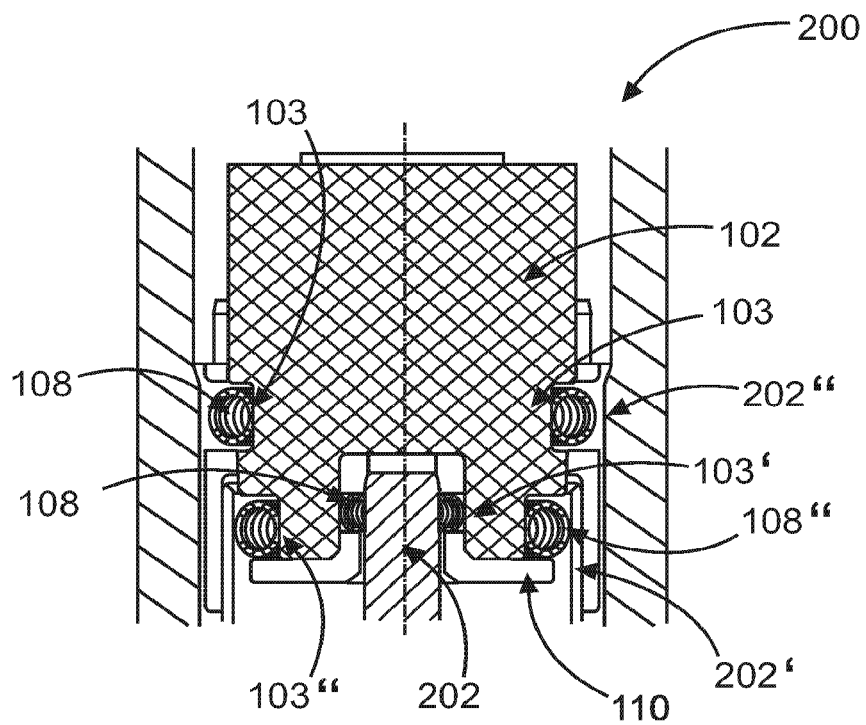

FIGS. 3a and 3b show an impedance limit switch 200 according to one embodiment. In particular, FIGS. 3a and 3b show two different sectional views of a part of an impedance limit switch 200. It should be noted that the electronic cup as well as the measuring head of the impedance limit switch 200 are not shown in FIGS. 3a and 3b. Unless otherwise described, the contacting unit 100 of the impedance limit switch of FIGS. 3a and 3b has the same elements and/or components as the contacting unit 100 of FIGS. 1 and 2. The impedance limit switch 200 comprises a contacting unit 100 as described above and below. In addition, the impedance limit switch 200 may include a process connection 202", a shield electrode 202', and a measurement probe 202. In this embodiment, as shown in FIG. 3b, the circuit board 102 has a plurality of contact pads 103, 103', 103". The insert 106 of the housing element 110 is configured to secure, clamp or hold the two annular springs 108', 108". The annular springs 108, 108', 108" are secured, clamped or retained such that a secure electrical contact is made and maintained between the respective contact surface 103, 103', 103" and the electrode 202, 202', 202".

Figure 4:
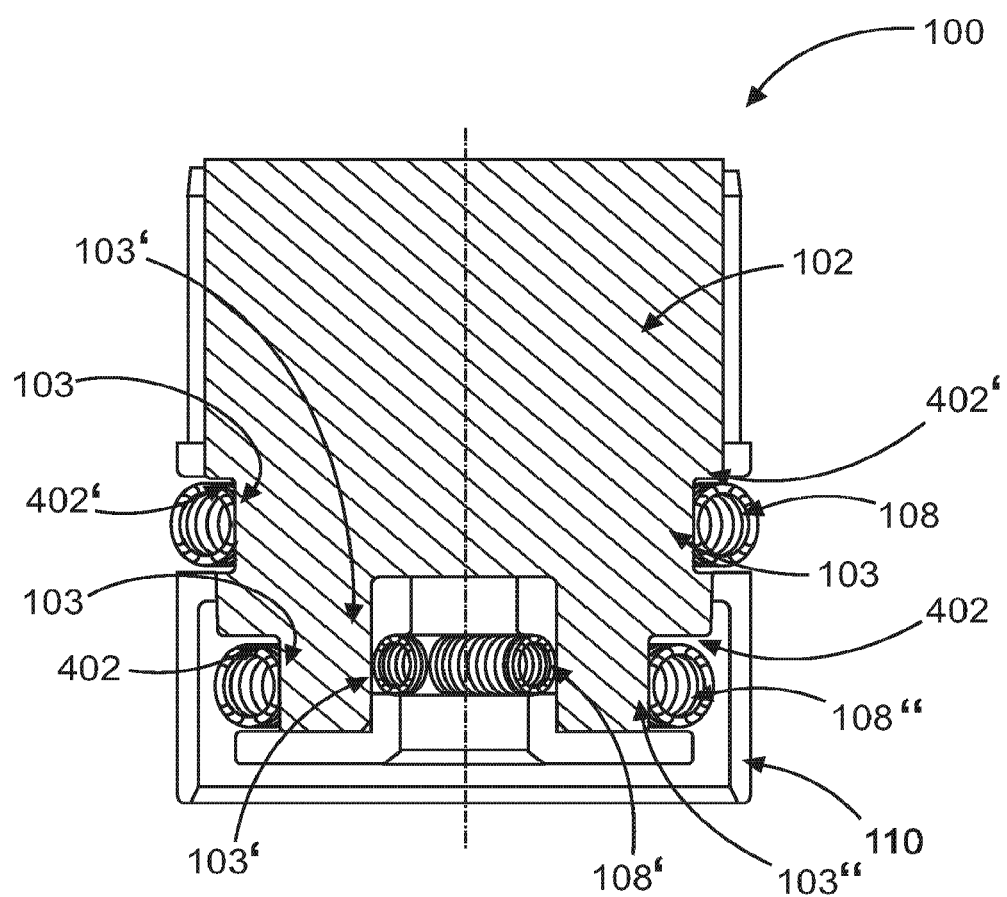
FIG. 4 shows a contacting unit according to a further embodiment.

FIG. 4 shows a contacting unit according to one embodiment. In particular, FIG. 4 shows a sectional view of a contacting unit. Unless otherwise described, the contacting unit 100 of FIG. 4 has the same elements and/or components as the contacting unit 100 of FIGS. 1 to 3. The printed circuit board 102 of the contacting unit 100 of FIG. 4 further comprises a plurality of notches 402, 402'. Such notches 402, 402' may serve for a better clamping of the annular springs 108, 108', 108" to the printed circuit board 102, in particular to its contact surface 103, 103', 103". The notches 402, 402' are arranged opposite each other in the radial direction of the printed circuit board 102. The notches 402, 402' may also have a notch radius corresponding to the cylinder radius of the corresponding annular spring 108, 108', 108'. In other words, the notches may have an outer contour that more or less corresponds to the outer geometry of the cylinder of the annular spring 108, so that the area of the contact surface 103, 103', 103" that is in contact with the annular spring may be increased.

Figure 5D:
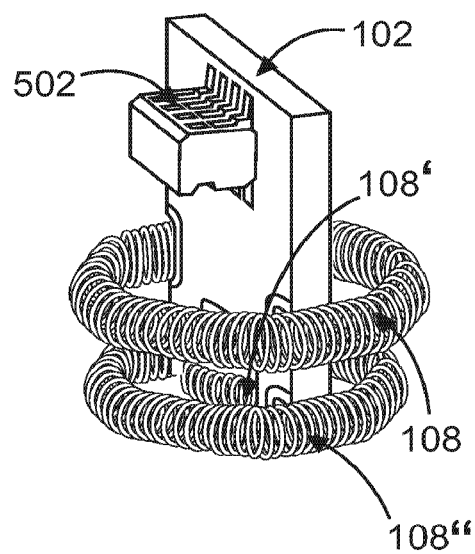
Figure 5E:
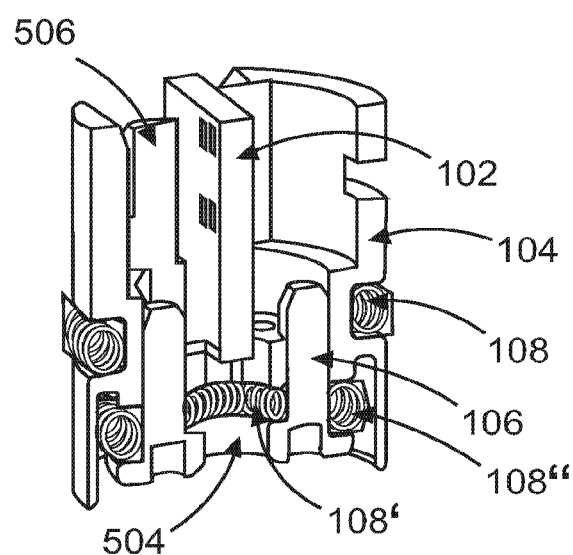

FIGS. 5a to 5e show a contacting unit 100 according to one embodiment. In particular, FIG. 5a shows an exploded 3D view of the contacting unit 100. Unless otherwise described, the contacting unit 100 of FIG. 5 comprises the same elements and/or components as the contacting unit 100 of FIGS. 1 to 4. The printed circuit board 102 may further comprise a socket unit 502, which may be set to make one or more electrical contacts between the contacting unit 100 and an electronics cup of an impedance limit switch 200. The three annular springs 108, 108',108", which are donut-shaped, have different cylindrical radii and different annular radii. The housing member 110 may include a void or recess such that one or more annular springs 108, 108', 108' may be received in such void or recess. The housing element 110 may further include a connection means 506, which may be configured to unplug the contacting unit 100 with an electronics cup of an impedance limit switch 200. Further, the housing element 110, in particular the insert 106, may include an opening 504 that may be configured to receive a probe 202 or an electrode 202.

Figure 6:
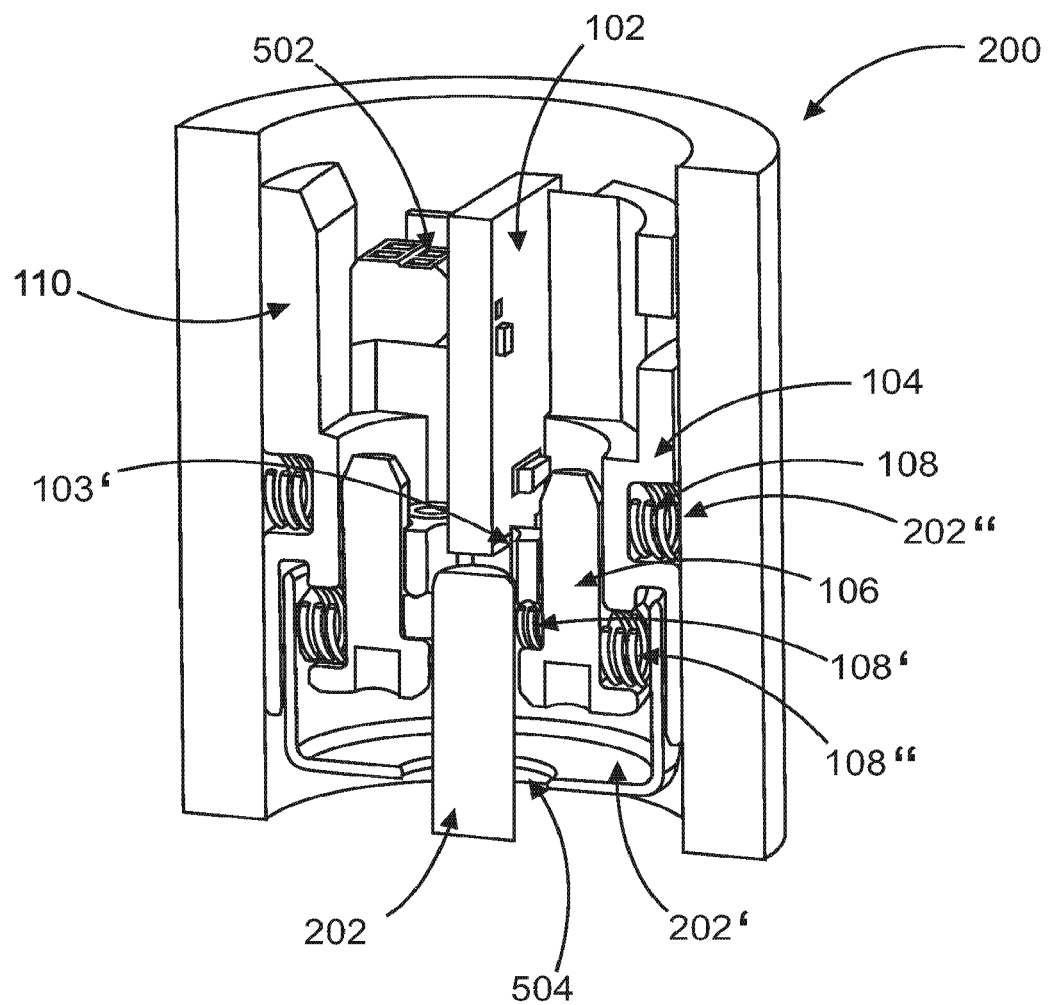
FIG. 6 shows an impedance limit switch according to a further embodiment.

FIG. 6 shows an impedance limit switch 200 according to one embodiment. In particular, FIG. 6 shows a 3D sectional view of an impedance limit switch 200 with a contacting unit 100. Unless otherwise described, the contacting unit 100 of the impedance limit switch of FIG. 6 has the same elements and/or components as the contacting unit 100 of FIGS. 1 to 5. Unless otherwise described, the impedance limit switch 200 of FIG. 6 has the same elements and/or components as the impedance limit switch 200 of FIG. 4. The shield electrode 202', or electrode, also has an opening 504, as does the insert 106, configured to receive the sensing probe 202 in the contacting unit.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A contacting unit for an impedance limit switch, the contacting unit comprising:
    a printed circuit board comprising two notches arranged on opposing sides of the printed circuit board, at least one of the two notches having an electrically conductive contact surface;
    a radially disposed annular spring arranged in the two notches of the printed circuit board and configured to establish electrical contact between the electrically conductive contact surface of at least one of the two notches and at least one electrode of the impedance limit switch; and
    a non-conductive housing element comprising a recess in which the radially disposed annular spring is mounted.

2. The contacting unit according to claim 1, wherein the notches are arranged opposite each other in a radial direction of the printed circuit board and have a notch radius corresponding to a cylinder radius of the radially disposed annular spring.

3. The contacting unit according to claim 1, wherein the non-conductive housing element is configured to clamp the radially disposed annular spring to the printed circuit board via the notches.

4. The contacting unit according to claim 1, wherein the contacting unit is configured to be plugged into an electronic cup of the impedance limit switch.

5. The contacting unit according to claim 1, wherein the at least one electrode is a measuring probe, a shield electrode, and/or a process connection.

6. The contacting unit according to claim 5, wherein the shield electrode surrounds, covers, and/or encases one or more annular springs.

7. The contacting unit according to claim 1,
    wherein the non-conductive housing element is configured in two parts and comprises a holder and an insert, and
    wherein the holder and the insert are geometrically matched so that the insert is engageable with the holder to receive and retain the radially disposed annular spring.

8. The contacting unit according to claim 1, wherein the non-conductive housing element is rotationally symmetrical.

9. The contacting unit according to claim 1,
    wherein the electrically conductive contact surface of the printed circuit board is coated with an electrically conductive material, and/or
    wherein the radially disposed annular spring is coated with an electrically conductive material.

10. The contacting unit according to claim 1, wherein the non-conductive housing element is made of an injection molded plastic.

11. The contacting unit according to claim 1, further comprising two or three concentrically arranged annular springs.

12. The contacting unit according to claim 11,
    wherein the printed circuit board comprises two notches for each concentrically arranged annular spring, and
    wherein the two notches are configured to provide electrical contact between the corresponding concentrically arranged annular spring and the printed circuit board.

13. The contacting unit according to claim 11, wherein the two or three concentrically arranged annular springs have different or identical cylinder radii and/or different annular diameters.

14. An impedance limit switch, comprising:
a contacting unit according to claim 1;
an electronic cup; and
a measuring head configured to carry out a conductive and/or capacitive measurement and to record measurement data,
wherein the contacting unit is configured to transmit the measurement data from the measuring head to the electronic cup via the contacting unit.

15. The contacting unit according to claim 1, wherein the contacting unit is configured to transmit measurement data from a measuring head via the contacting unit to an electronic cup of a measuring device.

* * * * *